United States Patent
Parkhurst et al.

[11] 3,757,824
[45] Sept. 11, 1973

[54] VACUUM TUBE AND CONNECTOR ASSEMBLY

[75] Inventors: Robert H. Parkhurst; William R. Beck; Edward M. Bungo, all of Warren, Ohio

[73] Assignee: General Motors Corporaion, Detroit, Mich.

[22] Filed: May 15, 1972

[21] Appl. No.: 253,206

[52] U.S. Cl................ 137/798, 285/39, 285/137 R
[51] Int. Cl............................................. F16l 39/02
[58] Field of Search .................. 137/798; 285/8, 39, 285/137 R

[56] References Cited
UNITED STATES PATENTS

| | | | |
|---|---|---|---|
| 3,590,855 | 7/1971 | Woollen et al................... | 285/137 R |
| 3,523,700 | 8/1970 | Palmer............................ | 285/137 R |
| 3,179,443 | 4/1965 | Staffel......................... | 285/137 R X |
| 1,117,840 | 11/1914 | Hamilton................................ | 285/8 |
| 2,517,717 | 8/1950 | Rose................................... | 285/192 |
| 2,410,999 | 11/1946 | Reisner................................ | 174/8 |
| 2,846,246 | 8/1958 | Peras.............................. | 285/137 R |

Primary Examiner—Alan Cohan
Assistant Examiner—Gerald A. Michalsky
Attorney—W. E. Finken and W. A. Schuetz

[57] ABSTRACT

This disclosure relates to a tube and connector assembly for use in a control system including a valve with multiple male outlets and which comprises a plurality of tubes for connecting different ones of the male outlets of the valve with other parts of the control system and female connectors on the ends of the tubes which are adapted to mate with and communicate the male outlets of the valve with the tubes. The tube and connector assembly further comprises a connector housing which has a plurality of tapered openings therethrough for receiving the female terminals to align the same with the male outlets of the valve. The connector housing has slots co-extensive with the openings to enable the tubes to be received within the openings. The female terminals are thereafter received within the tapered openings by pulling on the tubes to frictionally and sealingly engage the connector housing whereby the female connectors are aligned with the male outlets of the valve and can be simultaneously connected thereto.

3 Claims, 7 Drawing Figures

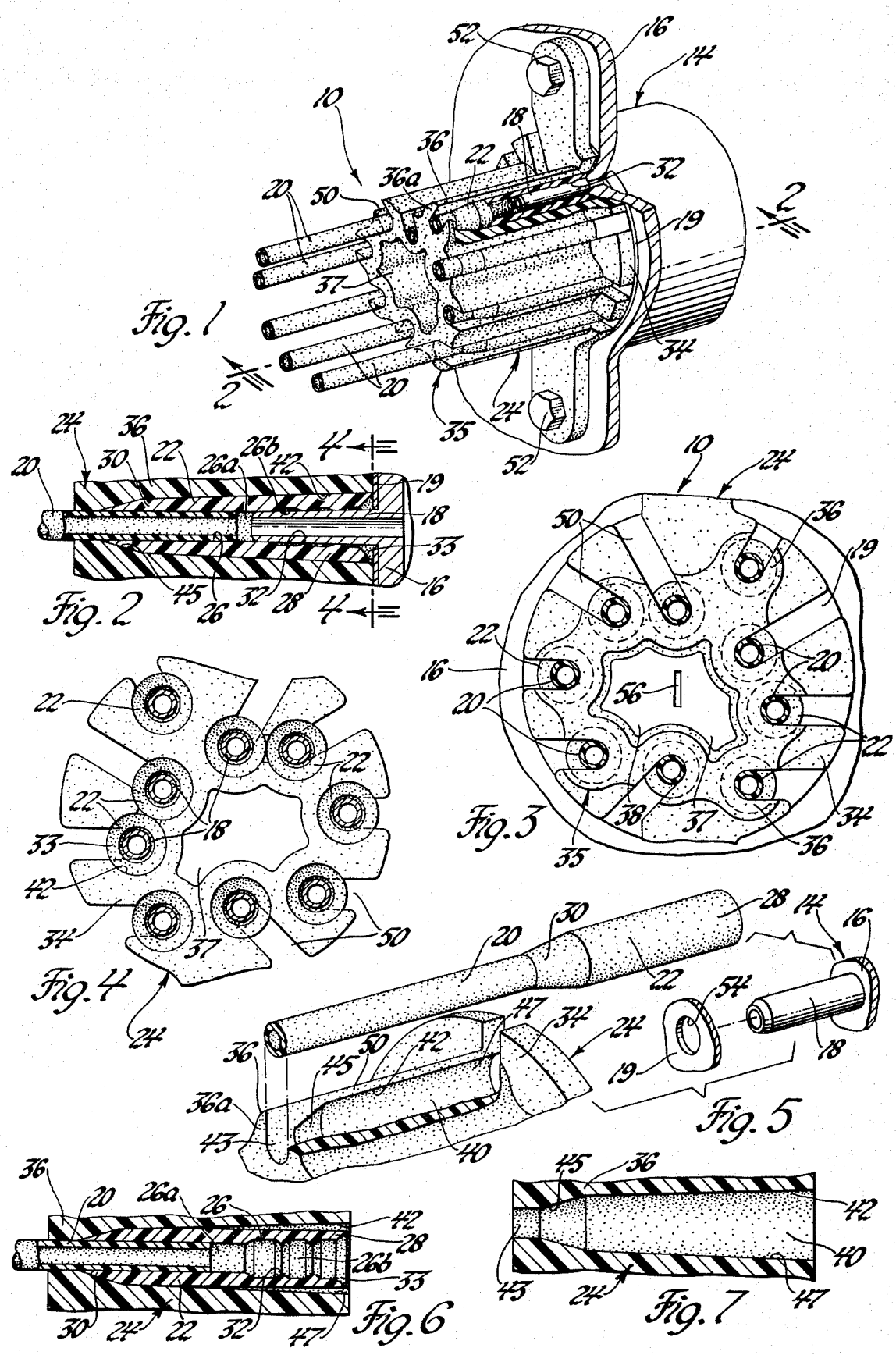

VACUUM TUBE AND CONNECTOR ASSEMBLY

The present invention relates to a vacuum tube and connector assembly for a control system including a valve with multiple male outlets, and more particularly, to a vacuum tube and connector assembly which provides for alignment and simultaneous mating of the vacuum tubes with the male outlets of the valve.

Connector housings have heretofore been provided wherein the terminal ends of a plurality of wires or tubes can be assembled thereto and where the connector housing can then be manipulated to simultaneously align and mate the terminal ends with the mating terminal ends of another system component. For example see U. S. Pat. Nos. 3,523,700, 3,469,863 and 2,964,437. Connectors have also heretofore been provided for purposes of sealing the openings in a wall or partition through which a wire or conduit passes and which receive the wires or conduits within generally complementary shaped openings via co-extensive slots or slits which extend to the edge of the connector. For example, see U. S. Pat. Nos. 2,410,999 and 2,846,246. Further, sealing connectors have heretofore been provided as described above which also provide axially spaced sealing lips within the openings receiving the wires or conduits in order to reduce the frictional resistance therebetween and to provide for axial adjustment of the wires of conduits within the openings. For example, see U. S. Pat. No. 2,517,717.

An object of the present invention is to provide a new and improved tube and connector assembly wherein the end connector of a plurality of tubes can be easily assembled with a connector housing and be retained in an interference fit therewith in order for the connector ends of the tubes to be simultaneously aligned and mated with the complementary tubular connectors of another system component.

Another object of the present invention is to provide a new and improved tube and connector assembly for use in a control system including a valve with multiple male outlets and which comprises a plurality of tubes for connecting different ones of the male outlets of the valve with other parts of the control system, female connectors on the ends of the tubes which are adapted to be mated with and communicate the male outlets of the valve with the tubes, and a connector housing which has a plurality of tapered openings therethrough for receiving the female connectors so they are alignable with the male outlets of the valve and which also have slots co-extensive with the openings to provide for the tubes to be received within the openings, and wherein the female terminals are received within the openings by pulling on the tubes and the female terminals frictionally engage the connector member and are retained in interference fit therewith when the female terminals are received within the tapered opening whereby the female terminals can be simultaneously aligned and mated with the male outlets of the valve.

Yet another object of the present invention is to provide a new and improved tube and connector assembly as described above and wherein the female connectors have integral O-ring sealing means for engaging the male outlets to provide sealed communicatin between the tubes and male outlets.

These and other objects of the invention are accomplished in a preferred embodiment, by providing a tube and connector assembly for use in a control system including a valve having multiple male outlets which comprises a plurality of tubes for connecting different ones of the male outlets of the valves with other parts of the control system. The assembly also includes female connectors on the ends of the tubes and which are generally cylindrical in shape and which have a given external diameter. The female connectors are adapted to mate with and communicate the male outlets of the valve with the tubes and have an axially extending passage therethrough. Further, the female connectors have a plurality of integral radially inwardly extending O-ring seals at axially spaced locations within the passage for frictionally and sealingly engaging the male outlets of the valve. The assembly further comprises a connector housing which has a plurality of annularly spaced connector retaining portions arranged in an inter-connected relationship. The annular connector retaining portions have inner walls which define frusto-conical openings therethrough for receiving the female connectors and which taper to a second diameter smaller than the outer or first diameter of the female connectors and which are alignable with the male outlets of the valve. Th connector retaining portions also have axially extending slots therein which are co-extensive with the openings to provide for the female connectors to be received within the openings by inserting the tubes laterally through the slots and by pulling the tubes through the openings. The female connectors frictionally engage the inner walls of the connector retaining portions and are retained in interference fit therewith when received within the openings whereby the female connectors can be simultaneously aligned and mated with the male outlets by manipulating the terminal housing.

These and other objects of the present invention will become more fully apparent from the following description and drawings wherein:

FIG. 1 is a perspective view with portions in section showing the tube and connector assembly of the present invention assembled to another system component;

FIG. 2 is a sectional view taken approximately along line 2—2 in FIG. 1;

FIG. 3 is a partial end view of the tube and connector assembly of the present invention;

FIG. 4 is a partial sectional view taken along line 4—4 in FIG. 2;

FIG. 5 is a partial exploded view of the tube and connector assembly of the present invention with parts in section;

FIG. 6 is a partial sectional view of the tube and connector assembly of the present invention substantially as shown in FIG. 2 but with parts thereof removed;

FIG. 7 is a partial sectional view similar to FIG. 6 but with parts removed.

As representing a preferred embodiment of the present invention, the drawings show a vacuum tube and connector assembly 10, a vacuum valve 14 having an end plate 16 with a plurality of spaced apart, axially aligned and co-extensive male outlets 18 and a removal plate 19. The vacuum valve 14 is typical of the rotary vacuum valves utilized in air conditioning systems for automotive vehicles which are controlled by a manually operable valve (not shown) to effect different modes and operations of the air conditioning system.

The vacuum tube and connector assembly 10 broadly comprises a plurality of vacuum tubes 20, an equal plurality of female terminals or connectors 22 on the ends of the vacuum tubes 20, and a terminal connector member or housing 24 to which the female terminals 22 and vacuum tubes 20 are assembled.

The vacuum tubes 20 serve to connect different ones of the male outlets 18 of the vacuum valve 14 via the female connectors 22 with other parts of the control system (not shown) such as would be used in an automotive air conditioning system, to effect different modes and operations thereof. Referring to FIG. 1, the vacuum tubes 20 are shown simply as elongated, annular conduits of flexible material, such as plastic.

Referring to FIGS. 2 and 6, the female connectors 22 are bonded or molded to the individual ends of the vacuum tubes 20 and are adapted to mate with and communicate the male outlets 18 of the vacuum valve 14 with the vacuum tubes 20. The female terminals 22 could be of any suitable material, but preferably are of a readily deformable material, such as a soft plastic. The female connectors 22 are generally cylindrical in shape and have a uniform given outside diameter. The connectors 22 have an axially extending, cylindrical opening 26 which extends from one end portion 28 of the terminal 22 to its other end portin 30. The latter end portion 30 has an exterior which is frusto-conical in shape. The opening 26 has an upper portion 26a which is cylindrical and which has the ends of the vacuum tubes received therein and also has a lower portion 26b which is generally larger in diameter than the upper portion 26a and which receives the male outlets when the assembly 10 is connected with the vacuum control valve 14 which will later be described in more detail. The connector 22 also includes a pair of integral O-ring seals 32 which extend radially inwardly into the lower portion 26b of the opening 26 at spaced apart locations. The O-ring seals 32 are intended to frictionally engage the outer periphery of each male outlet 18 of the vacuum valve 14 when the female connectors 22 are mated therewith in order to provide for sealed communication between the male outlets and the vacuum tubes 20. it should also be noted that the first end portion 28 of each female terminal 22 defines a slightly tapered opening portion 33 the internal diameter of which progressively decreases to assist in the alignment of the female terminals 22 with the male outlets 18 of the vacuum valve 14 when the vacuum tube and connector assembly 10 is being mated with the vacuum valve 14.

Referring to FIGS. 3 and 4, the terminal connector member or housing 24 is shown as a one-piece member which could be of any suitable material, such as plastic. The terminal connector member 24 has a flat, disc shaped base portion 34. The connector housing 24 also comprises a housing section 35 having a plurality of integrally connected connector retaining portions 36. The housing section 35 defines an irregularly shaped central through opening 37 which extends through the base 34. Referring to FIG. 3, the connector retaining portions 36 are integrally connected in an enclosed or web-like configuration and with adjacent connector retaining portions 36 being integrally interconnected with each other along their entire axial length. Referring to FIG. 7, each connector retaining portin 36 has an axially extending opening 40 therethrough which is defined by an inner wall 42 and which also extends through the base portion 34. Referring to FIGS. 6 and 7, the upper portion 43 of the opening 40 which is adjacent the free end portion 36a of each connector retaining portion 36, as defined by the inner wall 42, is cylindrical and substantially complementary in shape to the vacuum tube 20. The opening 40 also has a middle frusto-conical portion 45 which, when in its free state, is slightly under-sized with respect to the frusto-conical end portion 30 of each female connector 22. Further, th opening 40, as defined by the inner wall 42 includes a lower slightly tapered portion 47 which extends from the base portion 34, where its internal diameter is something greater than the outer diameter of each female connector 22, to the middle portion 45 of the opening 40, and wherebetween it tapers to an internal diameter which is less than the outer diameter of each female connector 22.

The connector housing 24 includes a plurality of radially extending slots 50, as shown in FIGS. 3 and 4, which extend through the base portion 34 and through the side of each individual connector retaining portion 36 for their entire length and which are axially aligned therewith. The width of the slots 50 is such as to allow the vacuum tubes to be laterally passed therethrough and received within the openings 40 of the connector retaining portions 36.

The removal plate 19 has a plurality of openings 54 complementary to and alignable with the male outlets 18 of the valve 14 and also includes a centrally located eyelet 56. The removal plate 19 is positioned between assembly 10 and the valve 14, as shown in FIGS. 2 and 5, for purposes to be later described in more detail.

In assembly with the female connectors 22 adjacent the base portion 34 of the terminal support member 24, as shown in solid lines in FIG. 5, each vacuum tube 20 is aligned with a different slot 50 and is passed therethrough to be received within the opening 40 of a connector retaining portion 36, as shown in phantom lines in FIG. 5. Thereafter, the female connectors 22 are axially received within the openings 40 of the connector retaining portions 36 by either pulling the vacuum tubes 20 through the openings 40 or by pushing the female connectors 22 therein. It should be understood that as each female connector 22 is received within the opening 40 of a connector retaining portion 36, the inner wall 42 of the connector retaining portion 36 eventually frictionally and sealingly engages the periphery of the female terminal 22. Further, when the frusto-conical end portion of each female connector 22 is received within the middle frusto-conical portion 45 of the opening 40, each female connector 22 will be frictionally retained within an opening 40 of a connector retaining portion 30 by virtue of the interference fit between the inner wall 42 and the periphery of the female connector 22. After each vacuum tube is assembled to the connector housing 24, the female connectors 22 can be simultaneously aligned with the male outlets 18 of the vacuum valve 14. Thereafter, the female connectors 22 can be moved into engagement and mated with the outlets 18 of the vacuum valve 14, as shown in FIG. 2, by manually forcing the connector housing 24 against the male outlets 18 of the vacuum valve 14. Prior to mating the assembly 10 with the vacuum valve 14, the removal plate 19 is slidably received upon the male outlets 18 and against the end plate 16 of the vacuum valve 14. When the tube and connector assembly 10 is forced completely upon the outlets 18 of the valve 14, the base portion 34 of the connector housing 24 and the end portions 28 of the connectors 22 abut the removal plate 19 and the eyelet 56 of the removal plate 19 is positioned within the through opening 37 of the connector housing 24. It should be noted that the O-ring seals 32 of the female connectors 22 peripherally engage the male outlets 18 to provide a sealing effect when the female connectors 22 are mated therewith. Further, because only the O-ring seals 32 of the connectors 22 engage the outlets 18, the total frictional force which must be overcome to mate the assembly 10 with the valve 14 is minimal. Therefore, assembly can be accomplished with relatively little effort. The vacuum tube and connector assembly can be retained in assembly with the vacuum valve 14 by merely mounting the base portion 34 to the end plate 16 by any suitable mechanical means, herein shown as bolts 52. The connectors 22 can be simultaneously removed from the outlets 18 by using a suitable special tool to hook the eyelet 56 of the removal plate 19, which is accessible via the through opening 37, and by pulling the assembly 10 and valve 14 apart. It should be understood that, when the vacuum tube and connector assembly 10 has been removed from the vacuum valve 14, the female terminals 22 and vacuum tubes 20 can be disassembled from the terminal support member 24 by merely pushing the vacuum tubes 20 back through the openings 40 with sufficient force to break the interference fit between the wall 42 and the periphery of each female terminal 22.

The foregoing disclosure relates to only one embodiment of the present invention which may be modified within the scope of the appended claims.

What is claimed is:

1. A multiple tube and connector assembly for a control system including a valve with multiple male outlets, comprising: a plurality of tubes for connecting different ones of the male outlets of the valve with other parts of the control system; hollow female connectors secured to the ends of said tubes and which are adapted to sealingly engage and mate with the male outlets of the valve to communicate the male outlets with said tubes; and a terminal connector housing having a plurality of spaced apart and longitudinally tapered openings therethrough for receiving said female terminals and to align the female connectors with the male outlets of the valve, said openings in said connector housing being in communication with axially and radially extending through side slots in said housing to enable the tubes to be laterally inserted into said openings and pulled back within the tapered openings until said female connectors secured to said tubes frictionally and sealingly engage the housing whereby said female connectors will be aligned with and can be simultaneously mated with the male outlets of the valve.

2. A multiple tube and connector assembly for a control system including a valve having multiple male outlets, comprising: a plurality of tubes for connecting different ones of the male outlets of the valves with other parts of the control system; female connectors secured on the ends of said tubes and being generally cylindrical in shape and having a given external diameter, said female connectors having an axially extending passage therethrough and being adapted to mate with and communicate the male outlets of the valve with the tubes, said female connectors having integral O-ring sealing means within said passage for frictionally engaging the male outlets of the valve to provide for sealed communication between the male outlets and said tubes; and a connector housing having a plurality of annular and spaced connector retaining portions arranged in an interconnected relationship, said connector retaining portions having inner walls defining frusto-conical openings therethrough for receiving said female terminals and which gradually taper to an internal diameter smaller than said external diameter of said female terminals, said openings being alignable with the male outlets of the valve, said terminal locking portions having axially extending slots therein and co-extensive therewith to provide for said female connectors to be received within said openings by inserting said tubes laterally through said slots and by pulling said tubes through said openings, said female connectors frictionally engaging the inner walls of said connector retaining portions and being retained in interference fit therewith whereby said female terminals can be simultaneously aligned and mated with said male outlets by manipulating said terminal connector.

3. In the air conditioning system of an automotive vehicle: a plurality of vacuum tubes; female connectors with an axially extending passage therethrough and being generally cylindrical in shape with a given external diameter, said female connectors having frusto-conical end portions received and molded upon the ends of said tubes, each of said female terminals also having a pair of integral radially inwardly extending O-ring seals at axially spaced locations within said passage; a one-piece connector housing having a plurality of annular and axially aligned connector retaining portions arranged in an interconnected and enclosed configuration, each of said portions having an inner wall defining an opening extending therethrough for receiving said female connectors, each of said openings having an upper portion generally complementary in shape to said tubes and having a middle frusto-conical portion generally complementary in shape with said frusto-conical end portion of said female connectors and also having a lower portion tapering to an internal diameter less than said given external diameter of said female connectors, said connector retaining portions each having an axially extending slot therein and co-extensive with said openings to provide for said female connectors to be received within said openings by inserting said tubes laterally through said slots and by pulling said tubes through said openings, said female connectors being frictionally engaged with said inner walls of said connector retaining portions when received within said openings and being retained in an interference fit with said inner wall; and a rotary vacuum valve for controlling communication between a vacuum source and various vacuum operated devices of the air conditioning system, said valve having an end plate with a plurality of male outlet terminals complementary in shape with said female terminals of said vacuum tubes and in a configuration adapted for said openings of said terminal locking portions to be alignable therewith whereby said female terminals can be simultaneously aligned and mated in sealed communication with said male outlets of said valve.

* * * * *